United States Patent [19]

Chen et al.

[11] Patent Number: 5,668,201
[45] Date of Patent: Sep. 16, 1997

[54] FLAME RETARDANT GRAFT COPOLYMER COMPOSITION

[75] Inventors: Fuh-Sheng Fred Chen; Satish Gaggar, both of Parkersburg, W. Va.; Yasuyuki Hiromoto, Ube, Japan

[73] Assignee: General Electric Company, Pittsfield, Mass.

[21] Appl. No.: 728,417

[22] Filed: Oct. 10, 1996

Related U.S. Application Data

[62] Division of Ser. No. 369,069, Jan. 5, 1995, abandoned.

[51] Int. Cl.$^6$ .............. C08K 5/15; C08K 5/03; C08K 3/10
[52] U.S. Cl. .............. 524/114; 524/371; 524/411; 524/412
[58] Field of Search .............. 524/114, 371, 524/411, 412

[56] References Cited

U.S. PATENT DOCUMENTS

| | | | |
|---|---|---|---|
| 3,674,812 | 7/1972 | Gibbons | 524/114 |
| 3,784,500 | 1/1974 | Gibbons | 524/114 |
| 3,928,494 | 12/1975 | Aliberti | 260/876 R |
| 3,962,164 | 6/1976 | Praetzel et al. | 524/371 |
| 3,993,621 | 11/1976 | McInerney et al. | 524/371 |
| 4,250,271 | 2/1981 | Morris et al. | 525/66 |
| 4,456,719 | 6/1984 | Yamamoto et al. | 524/114 |
| 4,713,420 | 12/1987 | Henton | 525/236 |
| 4,785,051 | 11/1988 | Henton | 525/71 |
| 4,874,815 | 10/1989 | Bubeck et al. | 525/71 |
| 4,895,898 | 1/1990 | Kress et al. | 525/67 |
| 5,041,498 | 8/1991 | Hare et al. | 525/71 |
| 5,177,132 | 1/1993 | Takahashi et al. | 524/114 |

*Primary Examiner*—Kriellion S. Morgan

[57] ABSTRACT

A thermoplastic composition is provided which exhibits desired levels of viscosity, dart impact strength, and flame retardancy. The composition includes respective amounts of a bulk vinyl aromatic-vinyl cyanide-rubber graft copolymer, an emulsion vinyl aromatic-vinyl cyanide-rubber graft copolymer and a flame retardant which contains an amount of a halogenated epoxy compound. The compositions are useful for making molded articles which exhibit desired levels of flame retardancy and impact strength. The thermoplastic compositions may also further contain respective amounts of non-epoxy halogenated compounds, flame retardant synergist such as antimony compounds, and drip suppressants such as fluoro polymers.

15 Claims, No Drawings

FLAME RETARDANT GRAFT COPOLYMER COMPOSITION

This is a continuation of application Ser. No. 08/369,069 filed on Jan. 5, 1995, now abandoned.

BACKGROUND OF THE INVENTION

1. Field of the invention

The present invention relates to flame retardant graft copolymer compositions, and more particularly relates to flame retardant graft copolymer compositions using a halogenated epoxy compound.

2. Description of the Related Art

Epoxy functional flame retardants, specifically epoxy functional brominated flame retardants, are known for enhancing the flame retardancy of graft copolymer compositions. Such compositions, however, have typically experienced undesirably high levels of viscosity during extended processing due to thermal instability of the compositions. Viscosity can be reduced by the addition of styrene-acrylonitrile rigid copolymer, but such an addition can undesirably lower the flame retardancy and dart impact strength of the compositions.

Accordingly, there is a need for flame retardant graft copolymer compositions which utilize an epoxy functional flame retardant, but which exhibit enhanced levels of thermal stability and desirable levels of dart impact strength and flame retardancy.

SUMMARY OF THE INVENTION

The present invention involves thermoplastic compositions which comprise respective amounts of a bulk vinyl aromatic-vinyl cyanide-rubber graft copolymer, and emulsion vinyl aromatic-vinyl cyanide-rubber graft copolymer and a halogenated epoxy flame retardant compound. The compositions exhibit the combined properties of flame retardancy, desirable levels of dart impact strength, and thermal stability. The compositions are useful for making flame retardant molded articles such as printer housings, computer housings and power tool housings.

DETAILED DESCRIPTION OF THE INVENTION

The thermoplastic compositions comprise respective amounts of a bulk vinyl aromatic-vinyl cyanide-rubber graft copolymer, an emulsion vinyl aromatic-vinyl cyanide-rubber graft copolymer, and a flame retardant comprising a halogenated epoxy compound. Preferably, the compositions also further comprise a metal synergist such as antimony compound and a halogenated polyolefin such as a fluoro polymer or a chlorinated polyolefin. Preferably the flame retardant further comprises a non-epoxy halogenated aromatic compound.

The bulk vinyl aromatic-vinyl cyanide-rubber graft copolymer is preferably present in the thermoplastic composition at a level of from 45 to 70 percent by weight, more preferably present at a level of from 50 to 70 percent by weight, and most preferably present at a level of from 55 to 60 percent by weight based on the total weight of the thermoplastic composition. The emulsion vinyl aromatic-vinyl cyanide-rubber graft copolymer is preferably present in the thermoplastic composition at a level of from 10 to 40 percent by weight based on the total weight of the thermoplastic composition, more preferably present at a level of from 10 to 30 percent by weight thereof, and most preferably present at a level of from 15 to 20 percent by weight thereof. Preferably the bulk graft copolymer and the emulsion graft copolymer are in a respective weight ratio of from 5:1 to 1.2:1, more preferably in a respective weight ratio of from 4:1 to 2:1, and most preferably in a respective weight ratio of between 3.5:1 and 2.5:1. The flame retardant (comprising the halogenated epoxy compound alone or in combination with the non-expoxy halogenated aromatic compound) is preferably present in the composition at a level of from 5 to 30 percent by weight based on the total weight of the composition, more preferably present at a level of from 10 to 25 percent by weight thereof, and most preferably present at a level of from 15 to 20 percent by weight thereof. The halogenated epoxy compound of the flame retardant is preferably present in the composition at a level of from 2 to 20 percent by weight based on the total weight of the composition, most preferably present at a level of from 3 to 15 percent by weight based on the total weight of the composition, and most preferably present at a level of from 5 to 10 percent by weight based on the total weight of the composition. As previously mentioned, the flame retardant optionally also comprises a non-epoxy halogenated aromatic compound. Preferably the non-epoxy halogenated compound is present in the composition at a level of from 0 to 20 percent by weight based on the total weight of the thermoplastic composition, more preferably present at a level of from 3 to 15 percent by weight thereof, and most preferably present at a level of from 5 to 10 percent by weight thereof. Preferably an antimony compound is present in the thermoplastic composition at a level of from 1 to 15 percent by weight based on the total weight of the composition, more preferably present at a level of from 2 to 10 percent by weight based on the total weight of the thermoplastic composition, most preferably present at a level of from 3 to 8 percent by weight thereof. The thermoplastic composition also preferably includes a fluoro polymer drip suppressant which is present in the composition at a level of from 0.1 to 2 percent by weight based on the total weight of the thermoplastic composition, more preferably present at a level of from 0.1 to 0.5 percent by weight thereof, and most preferably present at a level of from 0.1 to 0.3 percent by weight thereof.

The emulsion graft copolymer comprises (i) the diene rubber substrate, and (ii) a vinyl aromatic-vinyl cyanide rigid polymeric superstrate portion grafted to the rubber substrate wherein the superstrate. The rubber substrate is preferably present in the graft copolymer at a level of from 40 to 85 percent by weight (for example, 40 to 80 or 50 to 85 percent by weight) based on the total weight of the graft copolymer, more preferably from 40 to 75 percent by weight thereof, and most preferably 45 to 70 percent by weight thereof; and the rigid superstrate is preferably present at a level of from 15 to 60 percent by weight (for example, 20 to 60 or 15 to 50 percent by weight) based on the total weight of the emulsion graft copolymer, more preferably from 25 to 60 percent by weight thereof, and most preferably from 30 to 55 percent by weight thereof.

Examples of rubbery polymers for the substrate include: conjugated dienes, copolymers of a diene with styrene, acrylonitrile, methacrylonitrile or $C_1$ to $C_8$ alkyl acrylate which contain at least 50% (preferably at least 65% by weight) conjugated dienes, polyisoprene or mixtures thereof; olefin rubbers i.e. ethylene propylene copolymer (EPR) or ethylene propylene non-conjugated diene (EPDM); silicone rubbers; or $C_1$ or $C_8$ alkyl acrylate homopolymers or copolymers with butadiene and/or styrene. The acrylic polymer may also contain up to 5% of one or more polyfunctional crosslinking agents such as alkylenediol di(meth)acrylates, alkylenetriol tri(meth)acrylates, polyester di(meth)acrylates, divinylbenzene, trivinylbenzene, butadiene, isoprene and optionally graftable monomers such as, triallyl cyanurate, triallyl isocyanurate, allyl (meth) acrylate, diallyl maleate, diallyl fumarate, diallyl adipate, triallyl esters of citric acid or mixtures of these agents.

The diene rubbers may preferably be polybutadiene, polyisoprene and copolymers of butadiene with up to 35% by weight of comonomers such as styrene, acrylonitrile, methylmethacrylate or $C_1$–$C_6$-alkylacrylate which are produced by aqueous radical emulsion polymerisation. The acrylate rubbers may be cross-linked, particulate emulsion copolymers substantially of $C_1$–$C_8$-alkylacrylate, in particular $C_2$–$C_6$-alkylacrylate, optionally in admixture with up to 15% by weight of comonomers such as styrene, methylmethacrylate, butadiene, vinyl methyl ether or acrylonitrile and optionally up to 5% by weight of a polyfunctional crosslinking comonomer, e.g. divinylbenzene, glycolbis-acrylates, bisacrylamides, phosphoric acid triallylester, citric acid triallylester, allylesters of acrylic acid or methacrylic acid, triallylcyanurate, triallylisocyanurate. Also suitable are mixtures of diene- and alkylacrylate rubbers and rubbers which have a so-called core/sheath structure, e.g. a core of diene rubber and a sheath of acrylate or vice versa.

Specific conjugated diene monomers normally utilized in preparing the rubber substrate of the graft polymer are generically described by the following formula:

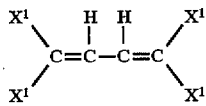

wherein $X^1$ is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethylbutadiene, 2-ethyl-1,3-pentadiene 1,3- and 2,4-hexadienes, chloro and bromo substituted butadienes such as dichlorobutadiene, bromobutadiene, dibromobutadiene, mixtures thereof, and the like. A preferred conjugated diene is 1,3 butadiene.

The substrate polymer, as mentioned, is preferably a conjugated diene polymer such as polybutadiene, polyisoprene, or a copolymer, such as butadiene-styrene, butadiene-acrylonitrile, or the like. The rubbery polymeric substrate portion must exhibit a glass transition temperature (Tg) of less than about 0° C.

Mixtures of one or more rubbery polymers previously described for preparing the monovinylidene aromatic graft polymers, or mixtures of one or more rubber modified monovinylidene aromatic graft polymers disclosed herein may also be employed. Furthermore, the rubber may comprise either a block or random copolymer. The rubber particle size used in this invention as measured by simple light transmission methods or capillary hydrodynamic chromatography (CHDF) may be described as having an average particle size by weight of select one of the following: 0.05 to 1.2 microns, preferably 0.2 to 0.8 microns, for the emulsion based polymerized rubber latices. The rubber substrate is preferably a particulate, highly crosslinked diene or alkyl acrylate rubber, and preferably has a gel content greater than 70%.

Preferred graft superstrates include copolymers of styrene and acrylonitrile, copolymers of α-methylstyrene and acrylonitrile and acrylonitrile-methylmethacrylate-vinyl aromatic copolymers. Specific examples of high rubber graft copolymers include but are not limited to the following: acrylonitrile-butadiene-styrene (ABS), acrylonitrile-styrene-butyl acrylate (ASA), methylmethacrylate-acrylonitrile-butadiene-styrene (MABS), acrylonitrile-ethylene-propylene-non-conjugated diene-styrene (AES).

Vinyl aromatic monomers which may be employed include styrene, alpha-methyl styrene, halostyrenes i.e. dibromostyrene, mono or di alkyl, alkoxy or hydroxy substitute groups on the nuclear ring of the monovinylidene aromatic monomer i.e. vinyl toluene, vinylxylene, butylstyrene, para-hydroxystyrene or methoxystyrene or mixtures thereof. The monovinylidenearomatic monomers utilized are generically described by the following formula:

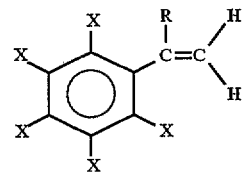

wherein X is selected from the group consisting of hydrogen, alkyl groups of 1 to 5 carbon atoms, cycloalkyl, aryl, alkaryl, aralkyl, alkoxy, aryloxy, and halogens. R is selected from the group consisting of hydrogen, alkyl groups of 1 to 5 carbon atoms and halogens such as bromine and chlorine. Examples of substituted vinylaromatic compounds include styrene, 4-methylstyrene, 3,5-diethylstyrene, 4-n-propylstyrene, α-methylstyrene, α-methyl vinyltoluene, α-chlorostyrene, α-bromostyrene, dichlorostyrene, dibromostyrene, tetrachlorostyrene, mixtures thereof and the like. The preferred monovinylidene aromatic monomers used are styrene and/or α-methylstyrene.

Comonomers which may be used with the monovinylidene aromatic monomer includes acrylonitrile, methacrylonitrile, $C_1$ to $C_8$ alkyl or aryl substituted acrylate, $C_1$ to $C_8$ alkyl, aryl or haloaryl substituted methacrylate, acrylic acid, methacrylic acid, itaconic acid, acrylamide, N-substituted acrylamide or methacrylamide, maleic anhydride, maleimide, N-alkyl, aryl or haloaryl substituted maleimide, glycidyl (meth) acrylates, hydroxy alkyl (meth) acrylates or mixtures thereof. The acrylonitrile, substituted acrylonitrile, or acrylic acid esters are described generically by the following formula:

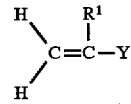

wherein $R^1$ may be selected from the same group set out for R as previously defined and Y is selected from the group consisting of cyano and carbalkoxy groups wherein the alkoxy group of the carbalkoxy contains from one or about twelve carbon atoms. Examples of such monomers include acrylonitrile, ethacrylonitrile, methacrylonitrile, chloroacrylonitrile, α-bromoacrylonitrile, methyl acrylate, methyl methacrylate, ethyl acrylate, butyl acrylate, propylacrylate, isopropyl acrylate and mixtures thereof. The preferred monomer is acrylonitrile and the preferred acrylic acid esters are ethyl acrylate and methyl methacrylate. It is also preferred that the acrylic acid esters, when included, are employed in combination with styrene or acrylonitrile.

The ungrafted rigid polymers (typically free of rubber) may be included in the composition and are resinous, thermoplastic polymers of styrene, methylstyrene, styrenes substituted in the nucleus such as p-methylstyrene, methyl acrylate, methylmethacrylate, acrylonitrile, methacrylonitrile, maleic acid anhydride, N-substituted maleimide, vinyl acetate or mixtures thereof. Styrene/ acrylonitrile copolymers, α-methylstyrene/acrylonitrile copolymers and methylmethacrylate/acrylonitrile copolymers are preferred. The impact modifier may be used to impact modify the ungrafted rigid polymers by blending therewith. For blends of an ungrafted rigid copolymer (such as styrene-acrylonitrile copolymer) with an emulsion high rubber graft (HRG) copolymer (such as acrylonitrile-butadiene-styrene graft copolymers), the rubber loading will typically range from 10 to 40% rubber based on the total weight of the rubber modified resin.

The ungrafted rigid copolymers are known and may be prepared by radical polymerisation, in particular by emulsion, suspension, solution or bulk polymerisation. They preferably have number average molecular weights of from 20,000 to 200,000.

The number average molecular weight of the grafted rigid superstrate of the monovinylidene aromatic resin is designed to be in the range of 20,000 to 350,000. The ratio of monovinylidene aromatic monomer to the second and optionally third monomer may range from 90/10 to 50/50 preferably 80/20 to 60/40 more preferably 79/20 to 75/25. The third monomer may optional replace 0 to 50% of one or both of the first and second monomers.

The thermoplastic compositions of the present invention further contain a low rubber graft copolymer (bulk vinyl aromatic-vinyl cyanide-rubber graft copolymer) which is obtained by bulk polymerization of vinyl aromatic monomer and vinyl cyanide monomer in the presence of a rubbery substrate. The bulk graft copolymer preferably contains from 5 to 25 percent by weight rubber based on the total weight of the bulk graft copolymer, more preferably contains from 10 to 15 percent by weight thereof, and most preferably contains about 11 percent by weight thereof. The bulk graft copolymer further contains a superstrate which is grafted to the rubbery substrate thereof, and the superstrate is preferably present at a level of from 75 to 95 percent by weight based on the total weight of the bulk graft copolymer, more preferably present at a level of from 85 to 90 percent by weight thereof, and most preferably is present at a level of about 89 percent by weight thereof. The superstrate of the bulk graft copolymer preferably contains from 22 to 28 percent by weight vinyl cyanide monomer, more preferably from 23 to 27 percent by weight thereof, and most preferably 25 percent by weight thereof; and contains the vinyl aromatic monomer at a level of from 72 to 78 percent by weight based on the total weight of the superstrate, more preferably 73 to 77 percent by weight thereof, and more preferably about 75 percent by weight thereof. The rubbery substrate is preferably in the form of particles having an average particle size (weight average) of from 0.8 to 5 microns, and more preferably from 1.0 to 2.0 microns. As mentioned above, the emulsion (high rubber) graft copolymer is obtained by emulsion polymerization, and the bulk (low rubber) graft copolymer is obtained by bulk (or bulk-suspension) polymerization.

The composition preferably has a total rubber content of between 5 and 30 percent by weight based on the total weight of the composition, more preferably between 10 and 25 percent by weight thereof, and most preferably about 16 percent by weight thereof.

Most preferably the bulk graft copolymer is an acrylonitrile-styrene-butadiene rubber graft copolymer.

Most preferably the emulsion graft copolymer is an acrylonitrile-styrene-(styrene butadiene) rubber graft copolymer.

Non-epoxy halogenated aromatic compounds which are suitable are in principle all those which are not volatile and are heat-stable during the preparation and processing of the moulding compositions according to the invention, that is to say which do not thereby split off halogen and can thus exert their flame-proofing action in cases of fire. Compounds which are particularly suitable are decabromodiphenyl ether, octabromodiphenyl, octabromodiphenyl ether and tribromotetrachlorotoluene, and furthermore oligomeric bromine compounds, such as, for example, oligo-carbonates based on tetrabromobisphenol A with and without phenol or halogenated phenol end capping agents, and, finally, also polymeric bromine compounds, such as, for example, high molecular weight polycarbonates based on tetrabromo-bisphenol A or nuclear-brominated polyphenylene oxides.

Non-epoxy halogenated aromatic compounds also include, for example, tetrabromobenzene, tetrachlorobenzene, pentabromotoluene, hexachlorobenzene, hexabromobenzene, hexabromobiphenyl, octabromobiphenyl, 2,2'-dichlorobiphenyl, 2,4'-dibromobiphenyl, 2,4'-dichlorobiphenyl, hexa-bromobiphenyl, triphenylchloride, tetrachlorophthalic acid, tetrachloroanhydride, tetrabromophthalic acid, tetrabromophthalic anhydride, tribromophenol, tetrabromophenol, as well as additional halogenated aromatic compounds known in the art. Also included are diaromatics of which the following are representative: 2,2-bis(3,5-dichlorophenyl) propane; bis(2-chlorophenyl) methane; bis(2,6-dibromophenyl) methane; 1,1-bis(4-iotophenyl) ethane; 1,2-bis(2,6-dichlorophenyl) ethane; 1,1-bis(2-chloro-4-iotophenyl) ethane; 1,1-bis(2-chloro-4-methylphenyl) ethane; 1,1-bis(3,5-dichlorophenyl) ethane; 2,2-bis(3-phenyl-4-bromophenyl) ethane; 2,3-bis(4, 6-dichloronaphthylpropane; 2,2-bis(2,6-dichlorophenyl) pentane; 2,2-bis(3,5-dichlorophenyl) hexane; bis(4-chlorphenyl) methane; bis(3,5-dichlorophenyl) cyclohexylmethane; bis(3-nitro-4-bromophenyl) methane; bis(4-hydroxy-2,6-dichloro-3-methyloxyphenyl) methane; 2,2-bis (3,5-dichloro-4-hydroxyphenyl) propane; bis (3,5-dibromo-4-hydroxyphenyl) propane; 2,2-bis (3-bromo-4-hydroxyphenyl) propane; 2,2-bis (3,5-dibromo-4-hydroxylphenyl) propane diglycidyl ester; bis(4-(2,3-dibromopropoxy)-3,5-dichlorophenyl) methane, or the like. The preparation of these and other applicable biphenyls are known in the art. In place of the divalent aliphatic group, in the above examples, there may be substituted sulfide, sulfoxy, and the like. For example there may be given, 2,4-dichloro-2',4'-dibromophenylsulfoxide, bis(2,4-dichlorophenyl) sulfide or the like.

Additional non-epoxy halogenated aromatic compounds are the halogenated diphenyl ethers. Especially preferred are those containing two to ten halogen atoms, such as decabromodiphenyl ether, octabromodiphenyl ether, hexabromodiphenyl ether, pentabromodiphenyl ether, tetrabromodiphenyl ether, tribromodiphenyl ether, dibromodiphenyl ether, hexachlorodiphenyl ether, pentachlorodiphenyl ether, tetrachlorodiphenyl ether, trichlorodiphenyl ether, dichlorodiphenyl ether and halogenated diphenyl polyalkylene ethers of the formula

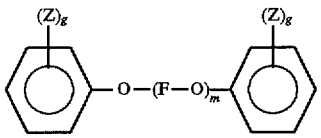

wherein g is a whole number of 1–5, preferably 5; m is a whole number of 1–10, preferably 1–3; Z is a halogen, e.g. bromine or chlorine; and F is a divalent hydrocarbon radical of 1–6, preferably 1–4 carbon atoms including methylene, ethylene, propylene, isopropylene, butylene, and the like. Preferred diphenyl ethers, are for example those containing 6–10 halogens including for instance bis(2,4,6-tribromophenyl) ether and decabromobiphenyl ether.

Also included within the scope of the present invention are halogenated phthalimides and halogenated bisphthalimides of the general formula

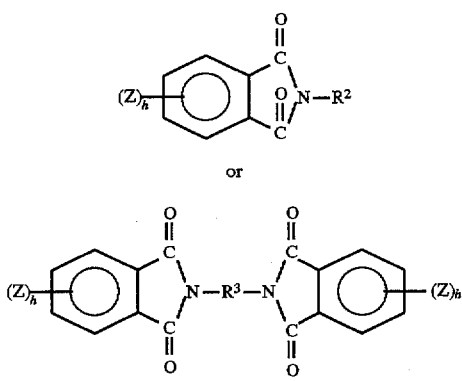

or mixtures thereof wherein $R^3$ is a hydrogen atom or a $C_1$–$C_6$, preferably $C_1$–$C_4$, alkyl or halogenated alkyl radical or a non-substituted or halogen substituted phenyl or naphthyl radical. $R^3$ is a single bond or a divalent radical, Z is a halogen atom, preferably, bromine or chlorine, and h is a whole number from 1–4 and is preferably 4. Exemplary of suitable halogenated phthalimides are: dichlorophthalimide, dibromophthalimide, tetrabromophthalimide, tribromophthalimide, tetrachlorophthalimide, trichlorophthalimide, n-methyl-tetrachlorophthalimide, N-ethyltetrachlorophthalimide, N-propyltetrachlorophthalimide, N-isobutyltetrachlorphthalimide, N-phenyltetrachlorophthalimide, N-(4-chloro-phenyl)-tetrachlorophthalimide, N-naphthyltetrachlorophthalimide, N-methyltetrabromophtthalimide, N-ethyltetrabromophthalimide, N-butyltetrabromophthalimide, N-phenyltetrabomophthalimide, N-ethyltribromopthalimide, N-butyltribromophthalimide, and the like.

Exemplary of suitable halogenated bisphthalimides include for example, bis-tetrabromophthalimide, bis-tetachlorophthalimide, bis-dibromodichlorophthalimide, bis-dibromophthalimide, and bis-tolubromophthalimide, N,N'-ethylene-di-tetrachlorophthalimide, N,N'-propylene-di-tetrachlorophthalimide, N,N'-butylene-di-tetrachlorophthalimide, N,N'-p'phenylene-di-tetrachlorophthalimide, 4,4'-ditetraphthalimido-diphenyl, N-(tetrachlorophthalimido)-tetrachlorophthalimide, N,N'-ethylene-ditetrabromophthalimide, N,N'-propylene-di-tetrabromophthalimide, N,N'-butylene-ditetrabromophthalimide, N,N'-p-phenylene-ditetrabromophthalimide, N,N'-ditetrabromophthalimido-diphenyl, N-(tetrabromophthalimido)-tetrabromophthalimide, N,N'-propylene-ditrichlorophthalimide, N,N'-propylene-di-tribromophthalimide, N,N'-p-phenylene-di-tribromophthalimide, and N,N'-di-tribromophthalimido-diphenyl. Mixtures of different halogenophthalimides can also be used.

Also included are the non-exuding, high and low molecular weight non-epoxy halogenated polymeric and copolymeric flame retardants. Inclusive of this group of flame retardants are the halogenated polystyrenes, especially the aromatically bound di- and tri-bromopolystyrenes; the halogenated polyphenylene oxides, especially the polydibromophenylene oxides; and the halogenated polyacrylates, especially those derived from the acrylic and methacrylic acids and esters thereof, particularly the benzylesters thereof, having aromatically bound halogen, e.g. bromine. Exemplary of suitable polyacrylate flame retardants are poly(pentabromobenzyl acrylate), poly (1,2,4,5-tetrabrtomoxylylene diacrylate) and tetrabromo-p-xylylene diacrylate-tetrachloro-p-xylylene diacrylate copolymer, especially preferred is polypentabromobenzyl acrylate.

Other suitable polymeric flame retardants are those derived from, at least in part, halogenated dihydric phenols. These include high and low molecular weight polycarbonates and copolycarbonates. The former may be prepared by reacting the dihydric phenol with a carbonate precursor, e.g. carbonyl bromide or carbonyl chloride and, optionally, other dihydric phenols, glycols and/or dicarboxylic acids.

Suitable halogenated epoxy compounds include diglycidyl ethers of dihydric phenols which may be prepared by the reaction of dihydric phenol with a glycidyl or a glycidyl containing monomer such as epichlorohydrin.

Suitable examples of the halogenated divalent phenols that may be employed in the preparation of the halogenated epoxy compounds include 2,2-bis(3,5-dibromo-4-hydroxyphenyl) propane, 2,2-bis(3,5-dichloro-4-hydroxyphenyl) propane, bis(3,5-dibromo-4-hydroxyphenyl) methane, bis(3,5-dichloro-4-hydroxyphenyl) methane, 2,2-bis(4-hydroxy-2,3,5,6-tetrabromophenyl) propane, 2,2-bis(4-hydroxy-2,3,5,6-tetrachlorophenyl) propane, or the like. The most preferred halogenated dihydric phenol is 2,2-bis(3,5-dibromo-4-hydroxyphenyl) propane, wherein said epoxy resin will have repeating units of the following formulas respectively.

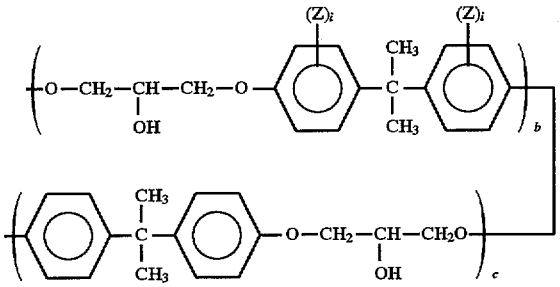

wherein Z is defined above, b and c are preferably from 1 to 10, and i is a whole number from 1–4, preferably 2.

Obviously, these polymeric halogenated epoxy compounds have as terminal groups, reactive monomers from which they are derived, e.g. the dihydric phenol, carbonyl halide or a glycidyl group, or, particularly in the case of the low molecular weight polymers, they may be terminated by the use of chain stoppers which are monofunctional and reactive with the end groups of the repeating units. Suitable chain stoppers will be known to those skilled in the art and include, generally, monohydroxy compounds, e.g., methanol, ethanol, phenol, etc.; monocarboxylic acids or acid halides, among others. Particularly suitable are halogenated, e.g. bromine or chlorine, chain stoppers as for example the $Br_1$ to $Br_5$ or $Cl_1$ or to $Cl_5$ substituted phenols, especially tribromophenol.

The molecular weight of the polymeric halogenated epoxy compounds may vary widely and are generally from 2000 to 40,000. Preferred high molecular weight flame retardant polymer will have 20,000 to 40,000 molecular weight. Also halogen content may vary widely. The preferred halogen content is from about 20% to greater than 80%, preferably from about 35 to about 70%.

The manner of adding the flame additives to the thermoplastic compositions of the present invention is not critical; suitable methods are conventional and would be obvious to those skilled in the art.

In addition to the flame retardant compositions used herein, one may also use, and it is preferred to use, a flame retardant synergist, particularly the inorganic or organic antimony compounds. Such compounds are widely available or can be made in known ways. In preferred embodiments, the type of antimony compound used is not critical, the choice being primarily based on economics. For example, as inorganic compounds there can be used antimony oxide, antimony carbonate, antimony trioxide, antimony phosphate, $KSb(OH)_6$ $NH_4SbF_3$, and the like. A wide variety of organic antimony compounds can also be used such as antimony esters with organic acids, cyclic alkyl antimonates, aryl antimonic acids and the like. Illustrative of organic antimony compounds, including inorganic salts of such compounds are: KSb tartrate; Sb caproate; $Sb(OCH_2CH_3)_3$; $Sb(OCH(CH_3)$ $CH_2CH_3)_3$; Sodium Antimonate; Sb polymethylene glycolate; polyphenylene antimony; and the like. Especially preferred are antimony oxide, antimony trioxide and sodium antimonate. These flame retardant synergists (such as antimony compounds) will be used in an amount of from about 1 to about 15 percent by weight based on the total weight of the composition, preferably from about 2 to 10 percent by weight thereof, and most preferably from 3 to 8 percent by weight thereof. Furthermore, it is possible to substitute other synergistic agents in total or, preferably, in part for the antimony compound, e.g. Zinc borate.

The fluoropolymer drip suppressants (preferably tetrafluoroethylene polymers) which are suitable according to the invention are polymers with fluorine contents of 65 to 76% by weight, preferably 70 to 76% by weight. Examples are polytetrafluoroethylene, tetrafluoroethylene/ hexafluoropropylene copolymers of tetrafluoroethylene copolymers with small amounts of fluorine-free copolymerizable ethylenically unsaturated monomers. The polymers are known. They can be prepared by known processes, thus, for example, for polymerization of tetrafluoroethylene in an aqueous medium with a catalyst which forms free radicals, for example sodium peroxydisulphate, potassium peroxydisulphate or ammonium peroxydisulphate, under pressures of 7 to 71 kg/cm² and at temperatures of 0° to 200° C., preferably at room temperatures of 20° to 100° C. (For further details, see, for example, U.S. Pat. No. 2,393,967).

The polytetrafluoroethylenes which are suitable according to the invention have average particle sizes of 0.05 to 20 μm, preferably 0.08 to 10 μm and a density of 1.2 to 1.9 g/cm³.

By adding tetrafluoroethylene polymers in particular, the dripping of the molten moulding composition during the burning process is reduced or completely prevented.

The brominated epoxy compound is preferably the reaction product of a halogenated diphenol and a glycidyl or glycidyl containing monomer such as epichlorohydrin. Preferably the halogenated epoxy compound has moieties of the formulas:

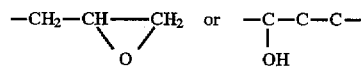

and halogen containing moieties.

EXAMPLES

The experimental FR ABS in general is composed of four parts of ingredients:

1. Basic Resins: SANs, Bulk ABS or emulsion ABS with various combinations and ratios.
2. Flame retardants: Br-Epoxy or TBBPA, or both and with antimony oxide and PTFE and CPE, with various combinations and ratios.
3. Lubricants: including several metal release metallic stearates, oligomeric or polymeric linear ethels, agents, heat stabilizer, silicon fluid, metallic stearates, oligomeric or polymeric linear ethels and EBS wax, with various combinations and ratios.
4. Pigments.

All of the required ingredients are weighed and mixed in Banbery mixer and two roll mill. Then the material is grounded and finally injection molded into test specimens. The mechanical properties, melt characteristics and flame resistance were measured according to ASTM standards.

TABLE 1

Basic Formulation and Comparison of Physical Properties

|  | 1 | A | B |
| --- | --- | --- | --- |
| Bulk ABS | 75 | 30 | 0 |
| Emulsion ABS 1 | 25 | 40 | 0 |
| Emulsion ABS 2 | 0 | 0 | 46 |
| SAN 1 | 0 | 0 | 54 |
| SAN 2 | 0 | 30 | 0 |
| Br-EPOXY | 11 | 11 | 13 |
| TBBPA | 9 | 9 | 11 |
| Sb2O3 | 7 | 7 | 9 |
| CPE | 0 | 0 | 6 |
| PTFE | 0.2 | 0.2 | 0 |
| Physical Properties |  |  |  |
| Izod (ft-lb/in) | 4 | 4.1 | 5.5 |
| Dart Impact (ft-lb) | 21.9 | 14.6 | 19.8 |
| MI @ 410 F (B1) | 0.68 | 1.47 | 0.47 |
| Melt Viscosity (poise) @ 450 F |  |  |  |
| 100/s | 7153 | 7117 | 10241 |
| 500/s | 2909 | 2772 | 4142 |
| 1000/s | 1975 | 1847 | 2616 |
| Viscosity Stability @ 450 F |  |  |  |
| 1 Min | 5513 | 5813 | 14132 |
| 5 Min | 5513 | 6114 | 19544 |
| 15 Min | 7116 | 9421 | 28114 |
| 30 Min | 7417 | 9421 | 24806 |
| Flame Test |  |  |  |
| UL94 V-0 | V-0 | V-1 | V-0 |
| 5-V | 5-V | 5-V | 5-V |

Emulsion ABS1 and ABS2 are high rubber grafts containing 50% rubber. SAN1 is a styrene-acrylonitrile copolymer having a weight average molecular weight of about 120,000 g/mol. SAN2 is a styrene-acrylonitrile copolymer having a weight average molecular weight of about 100,000 g/mol. Melt viscosity and stability were measured on a capillary rheometer.

Examples 1 and Comparative Examples A and B contain small amounts of additives such as lubricants and metal release agents.

The present examples show significant improvement of flow while retaining good impact strengths. From the Mobay stability test at various shear rates and temperature, the present formulations show substantially enhanced thermal stability.

TABLE 2

Comparison of Physical Properties for Bulk/Emulsion FR ABS Blend

|  | C | D | 2 | 3 | 4 |
|---|---|---|---|---|---|
| Bulk ABS | 0 | 100 | 75 | 75 | 75 |
| Emulsion ABS 3 | 100 | 0 | 25 | 25 | 25 |
| FR | 33 | 33 | 33 | 33 | 27 |
| CPE | 6 | 20 | 6 | 0 | 0 |
| PTFE | 0 | 0 | 0 | 0.2 | 0.2 |
| Physical Properties |  |  |  |  |  |
| Izod Impact (ft-lb/in) | 5.5 | 1.9 | 4.2 | 3.8 | 4 |
| Dart Impact (ft-lb) at Fail Point | 19.8 | 5 | 19.7 | 7.3 | 21.9 |
| Melt Viscosity (Poise) 450F, 1000/s Shear rate | 2616 | 1770 | 2351 | 2206 | 1975 |
| Viscosity Stability @475 F |  |  |  |  |  |
| 1 min. | 5513 | 5312 | 7617 | 5913 | 4109 |
| 30 min. | 10925 | 8820 | 5312 | 5011 | 3708 |
| Flame Rating |  |  |  |  |  |
| U-94-VO | V-O | V-O | V-O | V-O | V-O |
| U-94-5VA | Pass | Pass | Pass | Pass | Pass |

FR for examples C, D, 2 and 3, was 13 parts by weight (pbw) Br-Epoxy, 11 pbw tetrabromobisphenol A and 9 pbw Sb203 (total 33 pbw). FR for example 4 was 11 pbw BR-epoxy, 9 pbw tetrabromobisphenol A and 7 pbw $SB_2O_3$ (total 27 pbw). Note the greatly enhanced thermal stability of Examples 2–4 over Comparative Examples C and D. Emulsion ABS 3 is a high rubber graft containing 50% rubber. PTFE means polytetrafluoroethylene. CPE means chlorinated polyethylene. TBBPA means tetrabromobisphenol A. Examples E and F are comparative examples. Examples 1–14 illustrate the present invention.

TABLE 3

Effect of Rubber, PTFE and FR Loading in Bulk/Emulsion FR ABS Blend

|  | E | F | 5 | 6 |
|---|---|---|---|---|
| Bulk ABS | 90 | 80 | 75 | 70 |
| Emulsion ABS 2 | 10 | 20 | 25 | 30 |
| BR Epoxy | 11 | 11 | 11 | 11 |
| TBBPA | 9 | 9 | 9 | 9 |
| Sb203 | 7 | 7 | 7 | 7 |
| CPE | 0 | 0 | 0 | 0 |
| PTFE | 0.2 | 0.2 | 0.2 | 0.2 |
| Izod (ft-lb/in) | 2.3 | 3.5 | 4.5 | 5.7 |
| Dart (ft-lb) Fail Point | 4.49 | 8.36 | 22.81 | 28.82 |
| Melt Viscosity (Poise) @450F |  |  |  |  |
| 100/s | 7249 | 8538 | 9935 | 11459 |
| 500/s | 2653 | 3174 | 3431 | 3796 |
| 1000/s | 1721 | 2072 | 2170 | 2359 |
| Viscosity Stability 475F |  |  |  |  |
| 1 Min | 3834 | 6164 | 5001 | 5813 |
| 30 Min | 3232 | 5187 | 3608 | 5412 |
| Flame UL94 | VO | VO | VO | NSE |

NSE means non-self extinguishing.

TABLE 4

Effect of Rubber, PTFE and FR Loading in Bulk/Emulsion FR ABS Blend

|  | 7 | 8 | 9 | 10 |
|---|---|---|---|---|
| Bulk ABS | 75 | 75 | 75 | 75 |
| Emulsion ABS 2 | 25 | 25 | 25 | 25 |
| BR Epoxy | 11 | 11 | 11 | 11 |
| TBBPA | 9 | 9 | 9 | 9 |
| Sb203 | 7 | 7 | 7 | 7 |
| CPE | 0 | 0 | 0 | 0 |
| PTFE | 0 | 0.1 | 0.2 | 0.3 |
| Izod (ft-lb/in) | 4.3 | 4.2 | 4.5 | 4.6 |
| Dart (ft-lb) Fail Point | 21.07 | 28.09 | 22.81 | 25.1 |
| Melt Viscosity (Poise) @450F |  |  |  |  |
| 100/s | 10099 | 9912 | 9935 | 10354 |
| 500/s | 3399 | 3414 | 3431 | 3540 |
| 1000/s | 2127 | 2157 | 2170 | 2230 |
| Viscosity Stability 475F |  |  |  |  |
| 1 Min | 4811 | 5810 | 6001 | 3909 |
| 30 Min | 5412 | 3909 | 3608 | 4210 |
| Flame UL-94 | NSE | V1 | VO | NSE |

TABLE 5

Effect of Rubber, PTFE and FR Loading in Bulk/Emulsion FR ABS Blend

|  | 11 | 12 | 13 | 14 |
|---|---|---|---|---|
| Bulk ABS | 75 | 75 | 75 | 75 |
| Emulsion ABS 2 | 25 | 25 | 25 | 25 |
| BR Epoxy | 13 | 12 | 11 | 10 |
| TBBPA | 11 | 10 | 9 | 8 |
| Sb203 | 9 | 8 | 7 | 6 |
| CPE | 0 | 0 | 0 | 0 |
| PTFE | 0.2 | 0.2 | 0.2 | 0.2 |
| Izod (ft-lb/in) | 3.5 | 4 | 4.5 | 4.9 |
| Dart Impact (ft-lb) Fail Point | 14.67 | 25.04 | 22.81 | 25.75 |
| Melt Viscosity (Poise) @450F |  |  |  |  |
| 100/s | 9662 | 9938 | 9935 | 10599 |
| 500/s | 3255 | 3391 | 3431 | 3575 |
| 1000/s | 2037 | 2134 | 2170 | 2243 |
| Viscosity Stability 475F |  |  |  |  |
| 1 Min | 4009 | 5312 | 5001 | 8419 |

TABLE 5-continued

Effect of Rubber, PTFE and FR
Loading in Bulk/Emulsion FR ABS Blend

|  | 11 | 12 | 13 | 14 |
|---|---|---|---|---|
| 30 Min | 4109 | 4109 | 3608 | 9923 |
| Flame UL-94 | VO | VO | VO | NSE |

We claim:

1. A thermoplastic resin composition comprising:
   (a) a bulk graft copolymer comprising, based on the total weight of the bulk graft copolymer:
      (i) from 5 to 25 percent by weight of rubber substrate particles; and
      (ii) from 75 to 95 percent by weight of a superstrate derived from bulk polymerization of a vinyl aromatic monomer and a vinyl cyanide monomer in the presence of the rubber substrate particles, said bulk graft copolymer being present at a level of from 45 to 70 percent by weight based on the total weight of the thermoplastic composition;
   (b) an emulsion graft copolymer comprising, based on the total weight of the emulsion graft copolymer:
      (i) from 40 to 85 percent by weight rubber substrate particles; and
      (ii) from 15 to 60 percent by weight of a superstrate derived from emulsion polymerization of a vinyl aromatic monomer and a vinyl cyanide monomer in the presence of the rubber substrate particles, said emulsion graft copolymer being present at a level of from 20 to 40 percent by weight based on the total weight of the thermoplastic composition and
   (c) a flame retardant comprising a halogenated epoxy compound.

2. The composition of claim 1 wherein said halogenated epoxy compound is present at a level of from 2 to 20 percent by weight based on the total weight of the composition.

3. The composition of claim 1 wherein said flame retardant additionally includes a non-epoxy halogenated aromatic compound.

4. The composition of claim 1 wherein said thermoplastic composition additionally includes a fluoropolymer present at a level of from 0.1 to 2 percent by weight based on the total weight of the composition.

5. The composition of claim 1 wherein said composition comprises an antimony compound present at a level of from 1 to 15 percent by weight based on the total weight of the composition.

6. The composition of claim 1 wherein said bulk graft copolymer and said emulsion graft copolymer are in a respective weight ratio of between 5:1 and 1.2:1.

7. The composition of claim 1, wherein the flame retardant (c) is a bromonated epoxy compound and is present at a level of from 3 to 15 percent by weight based on the total weight of the composition and further comprising:
   (d) a non-epoxy brominated aromatic compound present at a level of from 3 to 15 percent by weight based on the total weight of the composition,
   (e) an antimony compound present at a level of from 1 to 15 percent by weight based on the total weight of the composition, and
   (f) A fluoro polymer present at a level of from 0.1 to 2 percent by weight based on the total weight of the composition.

8. The composition of claim 7 wherein said bulk graft copolymer and said emulsion graft copolymer are in a respective weight ratio of between 5:1 and 1.2:1.

9. The composition of claim 7 wherein said bulk graft copolymer and said emulsion graft copolymer are in a respective weight ratio of between 4:1 and 2:1.

10. The composition of claim 7 wherein said bulk graft copolymer and said emulsion graft copolymer are in a respective weight ratio of between 3.5:1 and 2.5:1.

11. The composition of claim 1 wherein said compounds (c) and (d) are present at a combined level of from 10 to 25 percent by weight based on the total weight of the composition.

12. The composition of claim 7 wherein said bulk graft copolymer is present at a level of from 50 to 70 percent by weight based on the total weight of the composition, and said emulsion graft copolymer is present at a level of from 10 to 30 percent by weight based on the total weight of the graft copolymer.

13. The composition of claim 2 wherein said composition consists essentially of (a), (b), (c), (d) and (f).

14. The composition of claim 7 wherein said composition consists of (a), (b), (c), (d) and (f).

15. The composition of claim 1 further comprising a flame retardant synergist.

* * * * *

UNITED STATES PATENT AND TRADEMARK OFFICE
CERTIFICATE OF CORRECTION

PATENT NO. : 5,668,201
DATED : Sept. 16, 1997
INVENTOR(S) : Fuh-Sheng Fred Chen, Satish Gaggar, Yasuyuki Hiromoto It is certified that error appears in the above-identified patent and that said Letters Patent is hereby corrected as shown below:

On the title page of the patent, the Related U.S. Application Data is incorrectly listed as a Division of Ser. No. 369,069, Jan. 5, 1996, abandoned; it should read: Continuation of Ser. No. 369,069, Jan. 5, 1996, abandoned.

Signed and Sealed this

Twentieth Day of January, 1998

Attest:

BRUCE LEHMAN

*Attesting Officer*         *Commissioner of Patents and Trademarks*